US006629202B1

(12) United States Patent
Cabrera et al.

(10) Patent No.: US 6,629,202 B1
(45) Date of Patent: Sep. 30, 2003

(54) VOLUME STACKING MODEL

(75) Inventors: Luis Felipe Cabrera, Bellevue, WA (US); Catharine van Ingen, Berkeley, CA (US); Norbert P. Kusters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/451,219

(22) Filed: Nov. 29, 1999

(51) Int. Cl.[7] ............................................... G06F 12/00
(52) U.S. Cl. ....................... 711/114; 711/202; 711/122
(58) Field of Search ............................... 711/114, 202, 711/122, 134; 710/20; 714/6

(56) References Cited

U.S. PATENT DOCUMENTS

| | | | | |
|---|---|---|---|---|
| 5,530,658 A | * | 6/1996 | Hafner et al. .................. | 703/6 |
| 5,553,285 A | | 9/1996 | Krakauer et al. ........... | 395/500 |
| 5,568,629 A | | 10/1996 | Gentry et al. ............... | 395/441 |
| 5,598,549 A | | 1/1997 | Rathunde .................... | 395/441 |
| 5,761,526 A | * | 6/1998 | Sakakura et al. .............. | 710/1 |
| 5,802,364 A | * | 9/1998 | Senator et al. .............. | 709/325 |
| 6,219,693 B1 | * | 4/2001 | Napolitano et al. ......... | 709/203 |

FOREIGN PATENT DOCUMENTS

| | | |
|---|---|---|
| EP | 0 485 110 A2 | 10/1991 |
| EP | 0 689 125 A2 | 2/1995 |
| EP | 0 732 653 A2 | 2/1996 |
| WO | WO 92/22865 | 12/1992 |
| WO | WO 97/07461 | 2/1997 |
| WO | WO 98/15895 | 4/1998 |

OTHER PUBLICATIONS

"XFS: A Next Generation Journalled 64–Bit Filesystem With Guaranteed Rate I/O", http://www–europe.sgi.com/Technology/xfs–whitepaper.html, Silicon Graphics—XFS White Paper, 1–20, (Mar. 15, 1999).

* cited by examiner

Primary Examiner—Matthew Kim
Assistant Examiner—Matthew D. Anderson
(74) Attorney, Agent, or Firm—Merchant & Gould P.C.

(57) ABSTRACT

Systems and methods for creating and maintaining a stacked volume using one more volumes or extents of a storage subsystem is disclosed. The systems and methods define a hierarchy of operations and components that process operations. The hierarchy includes plex operations for an entire volume, mapping operations that concatenate volumes and/or extents, plex operations for a volume or extent that is a sub-component of a stacked volume. The hierarchy also includes striping operations that create and maintain storage volume stripes comprising sub-volumes and/or extents. In addition, the hierarchy includes configuration operations that operate directly on a storage volume through a hardware or software volume provider. Together, the hierarchy defined allows a flexible, extensible mechanism to build stacked volumes that provide for increase performance, fault tolerance, and/or aggregate volume size, while elimination volume combinations that can cause performance problems.

25 Claims, 5 Drawing Sheets

VOLUME STACKING MODEL

RELATED APPLICATIONS

This application is related to the following applications, all of which are filed on the same day and assigned to the same assignee as the present application:

"Quorum Resource Arbitrator Within A Storage Cluster"—Ser. No. 09/449,579, filed Nov. 29, 1999, "Storage Management System Having Common Volume Manager"—Ser. No. 09/449,577, filed Nov. 29, 1999, "Storage Management System Having Abstracted Volume Providers"—Ser. No. 09/450,364, filed Nov. 29, 1999, "Volume Configuration Data Administration"—Ser. No. 09/450,300, filed Nov. 29, 1999, and "Volume Migration Between Volume Groups"—Ser. No. 09/451,220, filed Nov. 29, 1999.

FIELD OF THE INVENTION

This invention relates generally to computer data storage systems, and more particularly to stacking operations for data storage systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND OF THE INVENTION

As computer systems have evolved so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

A storage volume is a software abstraction of the underlying storage devices and is commonly the smallest self-contained unit of storage exposed by an operating system and administered by a file system. Storage volumes abstract the physical topology of the storage devices and may be a fraction of a disk, a whole disk or even multiple disks that are bound into a contiguous range of logical blocks.

Volumes are constructed from one or more extents, with each extent being a contiguous storage address spaces presented by the underlying storage device. An extent is typically characterized by the size of the address space and a starting offset for the address space from a base of the media. Volume mapping is the process of mapping the contiguous address space presented by the volume onto the usually non-contiguous storage address spaces of the underlying extents. Volume mappings are either implemented on a specialized hardware controller, referred to as a hardware volume provider, or in software by a software volume provider.

Volume mappings may be used to increase the fault tolerance, performance, or capacity characteristics of the underlying storage devices. For example, a technique for improving fault tolerance, known as mirroring or plexing a disk, uses multiple disks. When data is written to one disk the data is also written to a second disk; thus the second disk is a "mirror image" of the first disk. If one disk should fail the other disk is still available for use and has an exact copy of the information on the first disk.

In addition RAID numbers are often used to identify storage volume mappings. A RAID, or Redundant Array of Independent Disks, provides the ability to lose an extent without losing volume data. Access to the volume may be slower or more costly, but is not interrupted by the failure of the underlying extent. RAID1 implements mirroring. RAID3 and above all implement some sort of stripe with parity scheme; the different number indicates the arrangement of the data and check-data (or parity) extents. Striping is a mechanism where data for a file or file system is distributed among several different disks.

While the above-mentioned techniques can be used to provide increased performance, fault tolerance or storage capacity, several problems remain. First, it is useful to have combinations of volume mappings. Current systems do not provide a canonical (or well-understood) set of primitive operations such that a user or administrator can combine capabilities from different volume providers to achieve a desired final result.

A second problem is that the arbitrary combination of volume management constructs is quite large. Moreover, many combinations result in volumes that have either performance or reliability problems.

Therefore, there is a need in the art for a system that provides a volume stacking model that enables volume mappings to achieve fault tolerance, increased performance, and/or increased capacity while eliminating volume mappings that can potentially cause performance or reliability problems.

SUMMARY OF THE INVENTION

The above-mentioned shortcomings, disadvantages and problems are addressed by the present invention, which will be understood by reading and studying the following specification.

The systems and methods presented implement a hierarchy of stacking operations that create and maintain a stacked volume. One aspect of the system is that a logical volume manager comprises one or more components that define a stacking model having a plurality of levels. A configuration component controls the configuration of the underlying storage device. A striping component manages striping of volumes defined by the configuration component. A mapping component provides for concatenating volumes defined by the configuration component or the striping component.

Another aspect of the system is that one or more optional plex components provide for plexing, or mirroring, volumes. A first plex component provides for mirroring volumes defined by the configuration component or the striping component. A second plex component provides for mirroring volumes defined by the mapping component. Thus, the second plex component allows for mirroring an entire volume set, while the first plex component provides for mirroring a component volume of a volume set.

Thus, the invention provides for advantages not found in prior systems. The hierarchy imposed reduces unnecessary combinatoric complexity. It also helps ensure robust interaction between logical volume providers and a file system or other data manager, and greatly simplifies dynamic volume resizing of volumes, that is, growing or shrinking a volume without system disruption.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

Figure 1:
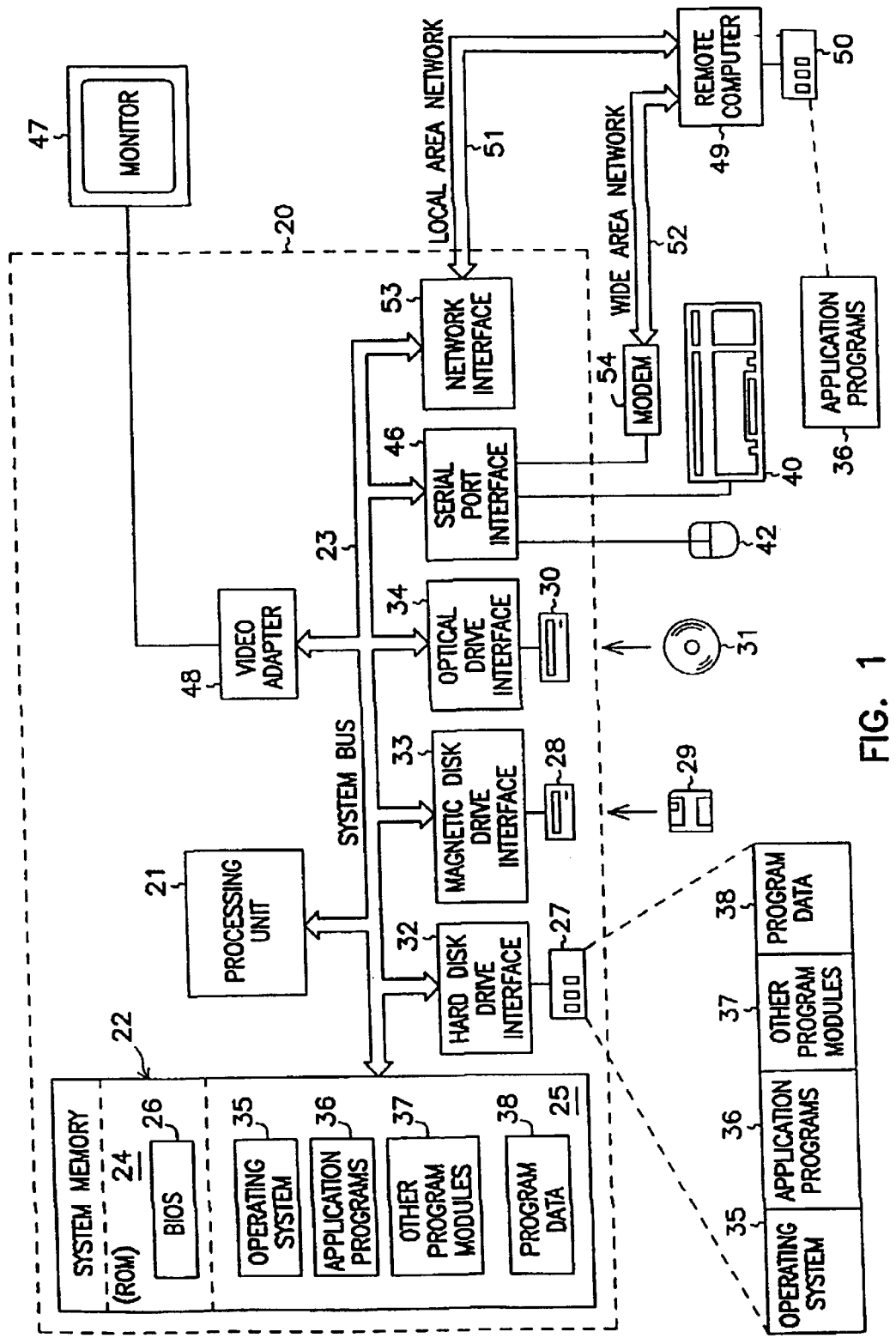
FIG. 1 shows a diagram of the hardware and operating environment in conjunction with which embodiments of the invention may be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, definitions of term used in the detailed description are provided. In the second section, the hardware and the operating environment in conjunction with which embodiments of the invention may be practiced are described. In the third section, a system level overview of the invention is presented. In the fourth section, methods of an exemplary embodiment of the invention are provided. Finally, in the fifth section, a conclusion of the detailed description is provided.

Definitions

This section presents definitions of terms used in the detailed description. Some of the terms are in common usage in the art, while others are specific to the invention.

Compromised—a status indicating that a fault tolerant volume is missing one or more disk or volume extents; for example, a mirror set with only one mirror currently available.

Configuration data—describes the mapping of physical resources to logical volumes.

Directed configuration—provider is explicitly provided with rules for choosing logical block remapping.

Diskpack—a collection of logical volumes and underlying disks. A diskpack is the unit of transitive closure for a volume.

Export—Move a disk platter and all volumes contained on that platter out of one diskpack.

Exposed—a volume is exposed to an operating system when the volume has an associated volume name (drive letter). The volume can then be made available to a file system or other data store.

Free agent drive—a disk drive which is not a member of a disk pack. Free agent drives cannot contain logical volumes that are exposed.

Health—volume fault management status. A volume may be initializing, healthy, compromised, unhealthy, or rebuilding.

Healthy—containing or able to contain valid data.

Hot-spotting—temporary plexing of a volume or collection of volume extents.

Import—Move a disk platter and all volumes contained on that platter into one diskpack.

Initializing—a status indicating that a volume is rediscovering volume configuration.

LBN—logical block number.

Logical block mapping—relationship between the logical blocks exposed to the logical volume provider to those exposed by the same provider.

Logical volume provider—software which exposes logical volumes. A provider includes runtime services, configuration data, and management services.

Management service—software that performs volume configuration, monitoring or fault handling.

Mapped volume—a simple linearly logical block mapping which concatenates volumes to expose a single larger volume.

Mirrored volume—a logical volume which maintains two or more identical data copies. Also termed RAID 1.

Parity striped volume—a logical volume which maintains parity check information as well as data. The exact mapping and protection scheme is vendor-specific. Includes RAID 3, 4, 5, 6.

Plexed volume—a dynamic mirror volume. Plexing is used to create a copy of a volume rather than to provide fault tolerance. The mirror is added to the volume with the intent of removal after the contents have been synchronized.

RAID—Redundant Array of Independent Disks.

Rebuilding—a status indicating that a previously compromised fault tolerant volume is resynchronizing all volume extent data.

Runtime service—software that executes on a per-IO request basis.

SCSI—Small-Computer Systems Interface.

Stacked volume—a volume that has been constructed by more than one logical block mapping operation. An example is a stripe set of mirror volumes. Stacking includes stripping, mapping, and plexing.

Striped volume—a logical block mapping which distributes contiguous logical volume extents across multiple volumes. Also termed RAID 0.

Unhealthy—a status indicating that a non-fault tolerant volume missing one or more disk or volume extents; data contained on unhealthy volumes must not be accessed.

Volume configuration stability—a status to denote whether a volume logical to physical mapping is undergoing change. A volume may be stable, extending, shrinking, plexing, or remapping.

Volume extent—a contiguous range of logical blocks contained on a volume. Volume extents are the smallest managed logical volume unit.

Volume status—a status to denote the current use of a volume by the system. A volume may be unused, hot spare, mapped, used, or unknown.

Hardware and Operating Environment

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
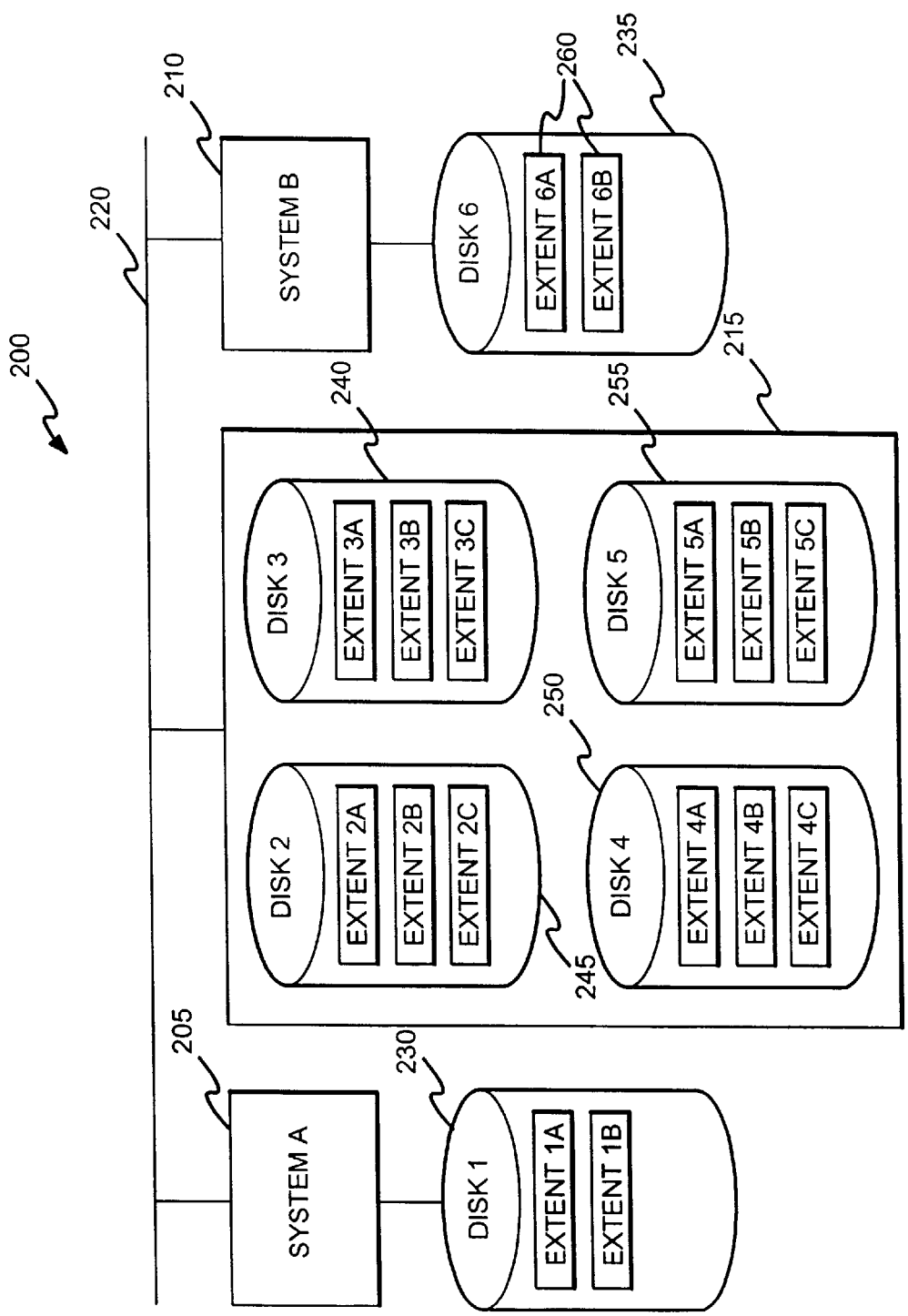
FIG. 2 is a diagram illustrating a hardware configuration used in exemplary embodiments of a volume stacking system.

FIG. 2 is a diagram illustrating a hardware configuration used in exemplary embodiments of a volume stacking system. Hardware configuration 200 includes computer systems 205 and 210, and disk cabinet 215, all communicatively coupled together via network 220. Computer systems 205 and 210 are computers with a variety of the components described above in reference to computer 20 and network 51 of FIG. 1. In an exemplary hardware configuration of an embodiment of the invention, computer systems 205 and 210 each have a disk operatively coupled to the system, disks 230 and 235 respectively.

Disk cabinet 215 is a peripheral containing a plurality of disks 240, 245, 250 and 255. A disk cabinet such as cabinet 215 is typically used to provide a large amount of storage to one or more computer systems.

Each of disks 230, 235, 240, 245, 250 and 255 have one or more extents 260. An extent is a contiguous storage address space instantiated by physical media such as a disk. An extent is characterized by its starting offset (in sectors) from the base of the disk media and its size. A disk can have a single extent that comprises the entire disk or some subset of the sectors on the disk. Alternatively, a disk can have a plurality of extents of varying sizes, with each extent covering a separate portion of the disk.

Extents are the basic building blocks used to construct volumes through a process called mapping. The allowable mappings are many-to-many: within one disk there may be extents that are parts of several volumes, and one volume can contain extents residing on several disks.

In general, there are five types of mappings of extents to volumes. The mapping types are as follows:

The above-described hardware configuration is used to present an example of a suitable hardware configuration for practicing the invention, and no embodiment of the invention is limited to the configuration detailed above. For example, the disk cabinet 215 is shown as connected via a network 220. In alternative embodiments of the invention, disk cabinet 215 is communicatively coupled to a computer system such as system 205 via a bus, as is known in the art. In addition, no embodiment of the invention is limited to a particular number of disks, disk cabinets, or extents.

Figure 3:
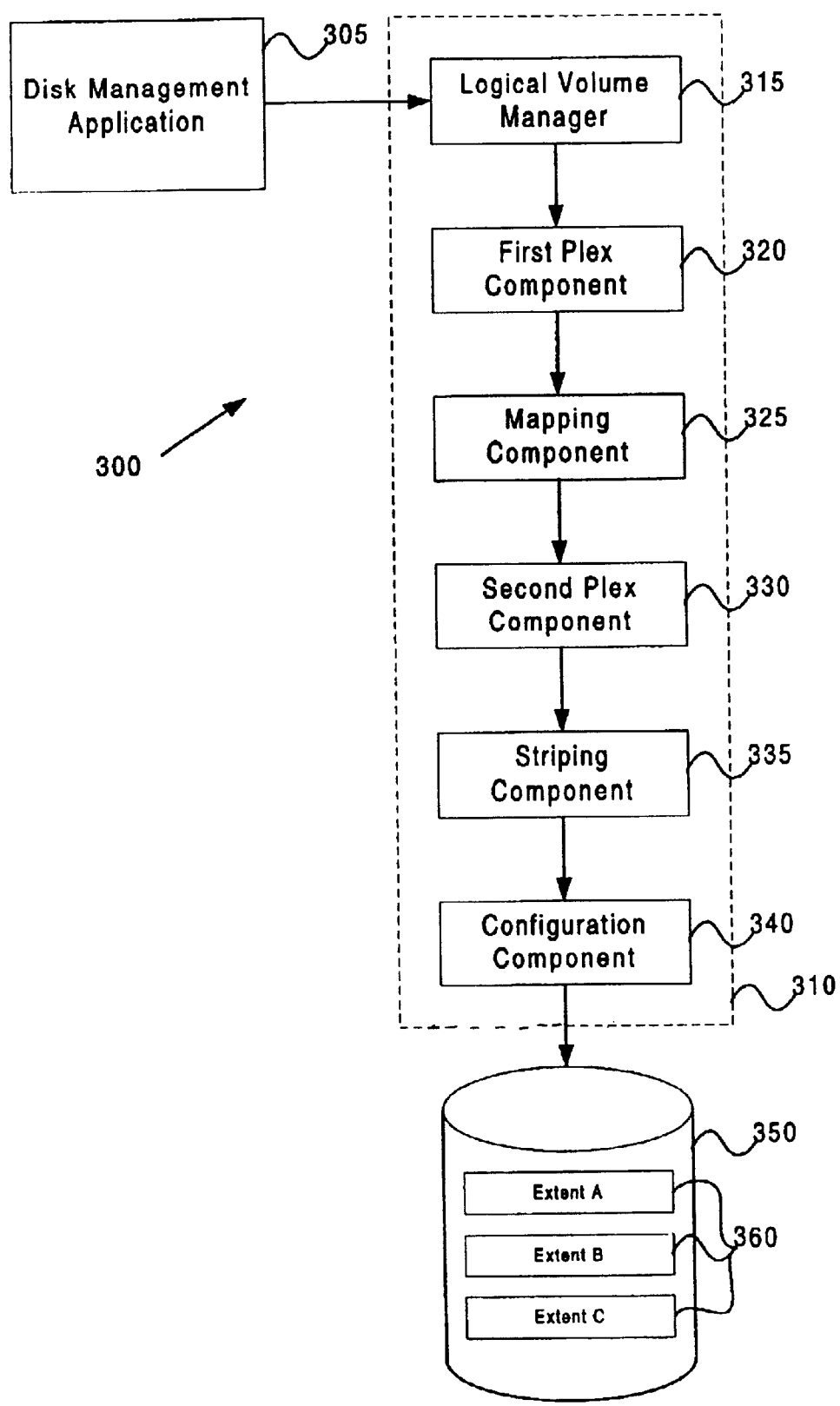
FIG. 3 is a diagram illustrating a system-level overview of exemplary embodiments of a volume stacking system.

A system level overview of the operation of an exemplary embodiment of the invention is described by reference to FIG. 3. The concepts of the volume stacking system of the invention are described as operating in a multiprocessing, multithreaded virtual memory operating environment on a computer, such as computer 20 in FIG. 1 and within a system configured in a manner similar to system 200 of FIG. 2. System 300 comprises a disk management application 305 which interfaces with a logical volume subsystem 310. Logical volume subsystem 310 in turn controls and manages volume created using extents 360 on one or more disks 350.

Application 305 is a computer program that requires the services of the logical volume subsystem 310. For example, application 305 can be a configuration management program designed to assist an inexperienced user of a comparatively small system construct and manage relatively few volumes. Alternatively, application 305 can be a configuration management program designed to assist the system manager of a comparatively large system construct and manage a relatively large number of volumes.

| | |
|---|---|
| • Simple | The volume consists of a single physical extent. In this case the volume may occupy an entire disk or only a portion thereof. |
| • Concatenation | The volume consists of at least two extents. The extents are joined in order. Concatenating two disks will yield a volume with size equal to the sum of the size of each disk; the first part of the volume address space resides on one disk, the later part on the second. |
| • Stripe without parity | The volume consists of at least two extents. Component pairs of extents must be of the same size. The extents are interleaved with size "I" (the "stripe width"). Striping two disks will again yield a volume with size equal to the sum of the size of each disk. Volume addresses 0:I reside on the first disk addresses 0:I; volume addresses I+1:2I reside on the second disk addresses 0:I; volume addresses 2I+1:3I reside on the first disk addresses I+1:2I; and so on. The purpose of striping is to achieve higher read/write data rates. |
| • Mirroring | The volume consists of at least two extents. The extents fully replicate all data. Mirroring two, three, or more disks of equal size will yield a volume with size equal to that of a single disk. Loss of one disk does not cause any loss of data since there is at least one disk remaining. Any contributing disk may satisfy a read to a mirrored volume since the data is identical on each. A write to a mirrored volume causes writes to each contributing disk to ensure that the data remains identical. Mirroring is also sometimes referred to as "plexing." |
| • Stripe with parity | Similar to stripe without parity, with the addition of an extent that maintains parity information. The parity information can be used to reconstruct a damaged or missing extent in the case of a disk failure. |

In addition, a volume may be constructed out of other component volumes. A volume constructed in this manner is called a stacked volume. An example of a stacked volume is a striped mirror. In the case of a striped mirror, a minimum of four extents is required. Extent pairs are mirrored to create two mirrored volumes. Those two volumes are then striped to create one stacked volume. That volume will have size equal to a single extent. If the extents were not of equal size, the smallest extent will determine the size of the volume.

Logical volume subsystem 310 is a subsystem running under the control of an operating system (not shown) that exposes one or more volumes to system users. Subsystem 310 has a number of components, including first plex component 320, mapping component 325, second plex component 330, striping component 335 and configuration component 340. The components taken together implement the methods described in detail below in the next section to process volume operations.

Configuration component 340 interfaces with disks or disk cabinets to configure the physical disks that comprise a volume. Configuration component can either perform "automagic" configuration, or directed configuration. Automagic configuration allows a user to describe characteristics that are important, such as fault tolerance or performance, and the system determines the precise parameters to supply to the disk subsystem. Further details regarding automagic configuration are provided in the co-filed, co-pending application entitled "Storage Management System Having Abstracted Volume Providers", which is hereby incorporated by reference.

In directed configuration, the user must supply one or more parameters that explicitly define a desired configuration.

It is desirable for the configuration component 340 to provide the logical volume interface that is closest to the data storage device. Several reasons exist why this is so. First, users generally consider fault tolerance to be a configuration issue (as opposed to a striping, or mapping related issue), and fault tolerance is typically provided by the hardware of the disk storage system. For example, fault tolerance is an attribute of the disks resident in a disk storage system. In addition, fault tolerance is an attribute that is typically best applied to the unit providing the finest granularity, which in this case, is a disk.

Striping component 335 handles operations that affect the striping of data across a number of extents or volumes. It is desirable for the striping component 335 to interface with the configuration component 340, because doing so enables the striping of heterogeneous components. For example, volumes or extents residing on disk storage systems from differing hardware providers can be striped. In addition, heterogeneous volume types such as a simple disk and a mirrored disk can be striped. Finally, if the striping component interfaced directly with the disk storage system, instead of the configuration component as shown in FIG. 3, the system would be unable to provide for volume sizes that conflicted with the stripe width.

In an embodiment of the invention, second-plex component 330 handles operations related to plexes of individual volumes or extents that are components of a larger stacked volume. In other words, these operations are related to creating and managing plexes that are a subset of the larger stacked volume. It is desirable to provide a plex component for sub-volumes because it provides for the migration of data between different volume providers. For example, a stacked volume created on volumes residing on disks managed by a first hardware provider and by migrated to volumes residing on disks managed by a second hardware provider. This is important both for media migration and for performance oriented load balancing.

Mapping component 325 handles operations that affect the mapping of volumes. Typically, these operations are related to the construction and maintenance of volumes or extents that are concatenated together to form larger stacked volumes. It is desirable for mapping component 325 to exist above stripe component 335 and configuration component 340, because this position allows volumes to be resized (i.e. to grow or shrink) using the smallest possible units of storage defined by the system.

In one embodiment of the volume stacking system of the invention, first plex component 320 processes volume operations that affect disk plexes (mirrors, or copies). First plex component 320 handles operations that affect plexes of entire volumes. It is desirable to provide a first plex component, because it allows a user to create backups and archives of a complete stacked volume at a particular point in time.

The above-described components are implemented by logical volume providers either in software executing on general-purpose computers or on a specialized hardware controller. The first type is called software logical volume provider; the latter a hardware logical volume provider. Software logical volume providers are components of the computer operating system. Hardware logical volume providers can take advantage of specialized hardware such as replicated devices or battery backed up memory for additional performance or reliability. Configuring a hardware provider usually requires specialized software provided by the controller vendor. Once configured, the actions of a hardware provider are transparent to operating system software.

In addition, any combination of hardware or software logical volume provider(s) can be used to implement the above-described components. A particular software or hardware logical provider may implement more than one of the above components. However, it is desirable that only one provider is used for any given component.

Also, physical and/or logical topological restrictions can apply. For example, it is impossible to use hardware mapping to extend a software stripe set if the stripe set is not fully contained within a single hardware cabinet.

The various embodiments of the invention define five general components for providing stacking operations. In one embodiment of the invention, the plex components 320 and 330 are optional. In an alternative embodiment of the invention, the components other than the plex components must be present, although a component can be implemented within the controlling logical volume subsystem 310 and hidden from a management application 305.

Methods of an Exemplary Embodiment of the Invention

In the previous section, a system level overview of the operation of an exemplary embodiment of the invention was described. In this section, the particular methods of the invention performed by a operating environment executing an exemplary embodiment are described by reference to a series of flowcharts shown in FIGS. 4 and 5. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 4 and 5 are inclusive of the acts required to be taken by an operating environment executing an exemplary embodiment of the invention.

Figure 4:
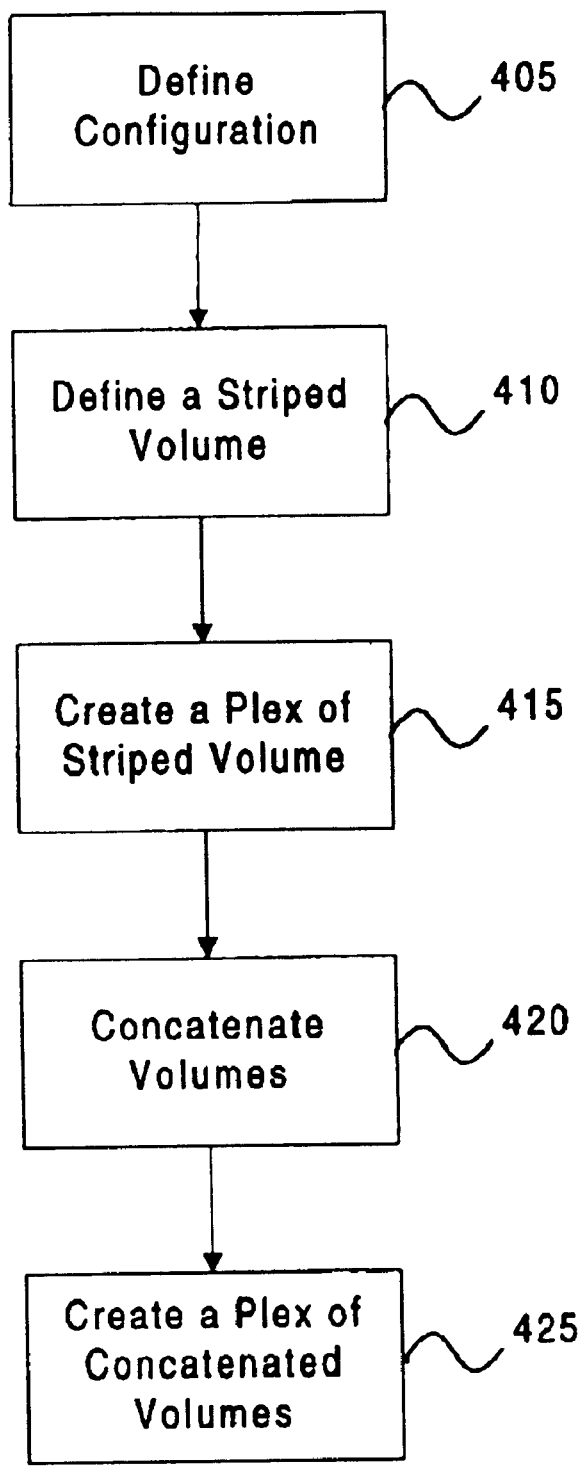
FIGS. 4–5 are flow diagrams illustrating methods implementing a volume stacking system according to exemplary embodiments of the invention.
Figure 5:
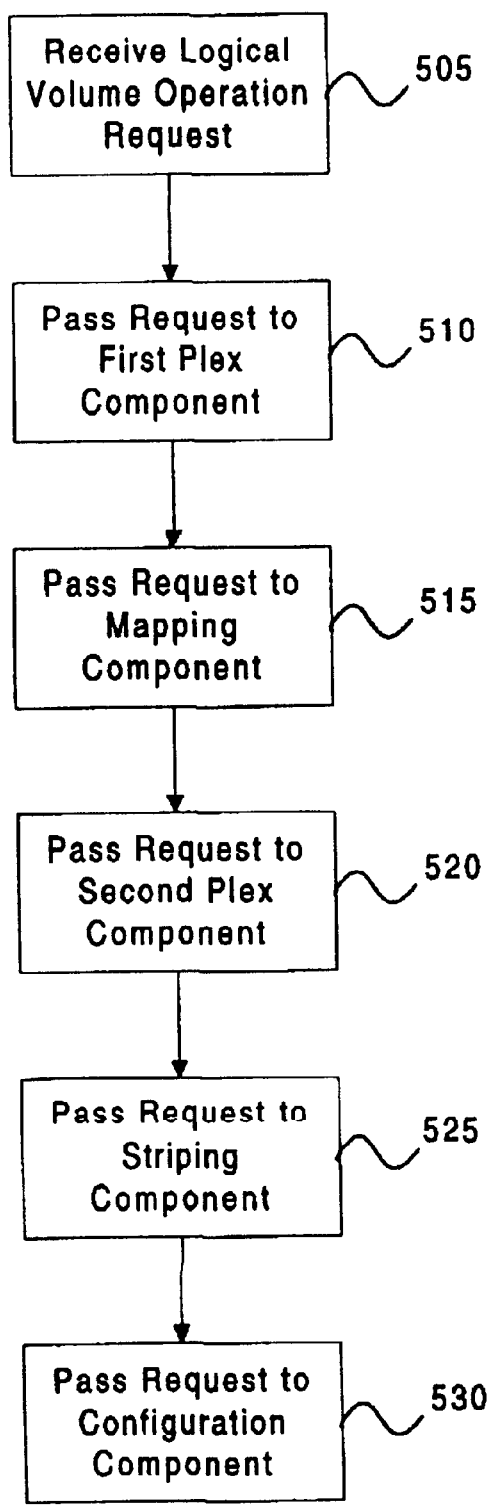

A method for defining a configuration for a stacked volume is presented in FIG. 4. The method begins at block 405 where a configuration is defined. The configuration can comprise an automagic configuration or an explicit mapping of physical disks. All additional mappings operate on volume extents exported by the next lower hierarchical layer. The minimal mapping performed is to create a simple volume (null re-mapping).

Next, at block 410, contributing volumes are striped. Striped volumes allocate monotonically increasing LBN (logical block number) ranges from each specified volume extent in the order specified by the user. By default, the number of extents specified on a list of contributing volumes or extents provided by the user determines the number of stripes. The stripe interleave can be supplied to the method, but a hardware or software logical volume provider implementing the method need not use the specified value. Volumes or extents that are to be striped must be of the same type and size. For example, attempting to stripe a parity stripe volume and a mirror volume will fail.

In one embodiment of the invention, striping causes the mapping type of an automagic volume to become fixed. In this embodiment, striping can be performed on volumes having a concatenate or plex type. The minimal striping performed is to stripe a single volume using zero interleave (null striping).

In one embodiment of the invention, a logical volume subsystem implementing the method proceeds to block 415, which creates a plex of the striped volumes created at block 410. Dynamic plexing is the use of a transitory mirror volume and is intended for creating a data snapshot intended for backup or for online media replacement. In an alternative embodiment of the invention, dynamic plexing is not provided, and block 410 is skipped.

Next, at block 420, the logical volume subsystem concatenates contributing volumes. The volume extents are concatenated in the order specified. Extents can be of any mapping type or size. Thus, one region of a volume can be mirrored, another striped, and another region can have null re-mapping.

Finally, in an embodiment of the invention, the logical volume subsystem proceeds to block 425, which creates a plex of a concatenated volume defined in block 420. This type of plex can be used to create a backup snapshot of the concatenated volume. It is desirable that backup snapshots be done only to concatenated volumes exposed to the file system or other data manager. This ensures that when the plex is subsequently removed, the file system on that volume is consistent. In an alternative embodiment of the invention, volume plexing is not provided, and block 425 is skipped.

It is desirable that the volume stacking operations proceed in sequence through the hierarchy defined by the method above, and blocks must not be revisited during any one stacking related operation. For example, it is not desirable to stripe a mapped volume—the desired volume must be constructed by mapping stripes. Similarly, it is not desirable to stripe a stripe set. The imposed hierarchy provides a simpler, yet sufficiently general, user model for logical volume services and limits the possibilities for theoretically valid, but foolish or ill-conceived, bindings.

FIG. 5 shows a method of performing configuration-related operations on stacked volumes after a stacked volume has been created. The method begins when a logical volume component such as logical volume manager 315, receives a logical volume operation request (block 505). The request is typically a configuration operation. These configuration operations include online media migration, sometimes called hot-spotting, which binds one or more new extents to an existing volume, synchronizes the volume contents, then removes the older extent(s). Configuration operations also include dynamic resizing, which causes a volume to grow or shrink by adding or removing extents.

Next, in one embodiment of the invention, the logical volume subsystem passes the request to a first plex component (block 510). The first plex component analyzes the operation request to determine if the operation affects a plex or disk mirror. If so, the first plex component determines the new extent and volume mapping action that is to take place.

The logical volume subsystem then causes the request to be passed to the mapping component (block 510). Here the mapping component analyzes the request to determine if the request will cause a change in the volume and/or extent mapping, and takes appropriate actions to satisfy the request. In the case of a resize operation, the actions taken to dynamically grow or shrink a volume depend on the active stacking. Concatenated volumes may be extended by growing the last (highest LBN) volume or by appending volumes. Shrinking a concatenated volume occurs by contracting the last volume and/or removing volumes altogether.

Next, in one embodiment of the invention, the logical volume subsystem passes the request to a second plex component (block 520). Here the second plex component analyzes the request to determine what, if any, action needs to be taken with respect to plexing (or mirroring) a volume or extent that is a component of another volume, i.e. a stacked volume.

The logical volume subsystem then passes the request to the striping component (block 525). Here the striping component analyzes the request to determine what action to take with respect to a striped volume. Again, the action taken depends on the active stacking. For example, stripe sets are extended or contracted by resizing each contributing volume in the stripe set.

Finally, the logical volume subsystem passes the request to the configuration component (block 530). Here the configuration component analyzes the request to determine the action that a volume provider should take with respect to automagic or directed volumes. Address space (in terms of sectors) is removed from or added to the end of the defined address space managed by the volume provider.

The particular methods implementing prefetch strategies performed by an operating environment to support various exemplary embodiments of the invention have been described. The methods have been shown by reference to a series of flowcharts including all the steps from 405 until 425, and from 505 until 530. The methods provide a mechanism for creating and maintaining stacked volumes.

CONCLUSION

The creation and maintenance of stacked volumes has been described. Logical disk volumes are created and maintained using a defined hierarchy of stacking operations.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while the invention has been described in terms of disk volumes, any mechanism providing persistent storage can be used instead of disks. The terminology used in this application with respect to storage is meant to include all of these environments. Therefore, it is manifestly intended that this invention be limited only by the following claims and equivalents thereof.

We claim:

1. A computerized system comprising:
   a computer comprising a processor, a memory, and a computer-readable medium operatively coupled together;
   an operating environment executed by the processor from the computer-readable medium;

a logical volume manager executed by the processor from the computer-readable medium and under the control of the operating environment;

a configuration component operating under the control of the logical volume manager;

a striping component operating under the control of the logical volume manager;

a mapping component operating under the control of the logical volume manager; and wherein the configuration component, the striping component and the mapping component create a stacked volume.

2. The computerized system of claim 1, further comprising a first plex component operating under the control of the logical volume manager.

3. The computerized system of claim 2, wherein the first plex component is operative to copy a volume of a stacked set of volumes managed by the logical volume manager.

4. The computerized system of claim 2, further comprising a second plex component operating under the control of the logical volume manager.

5. The computerized system of claim 4, wherein the second plex component is operative to copy a stacked set of volumes managed by the logical volume manager.

6. A computerized method for creating a logical volume, the method comprising:

defining a configuration for at least one disk subsystem, said defining operative to create a plurality of configured volumes;

defining a striped volume from the plurality of configured volumes; and concatenating the striped volume with at least one other volume to create a mapped volume.

7. The computerized method of claim 6, further comprising creating a plex of the mapped volume.

8. The computerized method of claim 6, further comprising creating a plex of the striped volume.

9. The computerized method of claim 6, wherein defining a configuration comprises providing data related to the intended use of the logical volume.

10. The computerized method of claim 9, wherein the data related to the intended use of the logical volume comprises an intended access pattern.

11. The computerized method of claim 9, wherein the data related to the intended use of the logical volume comprises a desired fault tolerance.

12. A computerized method for creating a stacked volume comprising:

receiving a logical volume operation request;

passing the request to a mapping component;

passing the request to a striping component; and passing the request to a configuration component.

13. The computerized method of claim 12, further comprising passing the request to a first plex component.

14. The computerized method of claim 13, further comprising passing the request to a second plex component.

15. The computerized method of claim 12, wherein the request is a request to change the size of a logical volume.

16. A computer-readable medium having computer-executable instructions for performing a method for creating a logical volume, the method comprising:

defining a configuration for at least one disk subsystem, said defining operative to create a plurality of configured volumes;

defining a striped volume from the plurality of configured volumes; and concatenating the striped volume with at least one other volume to create a mapped volume.

17. The computer-readable medium of claim 16, further comprising creating a plex of the mapped volume.

18. The computer-readable medium of claim 16, further comprising creating a plex of the striped volume.

19. The computer-readable medium of claim 16, wherein defining a configuration comprises providing data related to the intended use of the logical volume.

20. The computer-readable medium of claim 19, wherein the data related to the intended use of the logical volume comprises an intended access pattern.

21. The computer-readable medium of claim 19, wherein the data related to the intended use of the logical volume comprises a desired fault tolerance.

22. A computer-readable medium having computer executable instructions for performing a method for creating a stacked volume comprising:

receiving a logical volume operation request;

passing the request to a mapping component;

passing the request to a striping component; and passing the request to a configuration component.

23. The computer-readable medium of claim 22, further comprising passing the request to a first plex component.

24. The computer-readable medium of claim 23, further comprising passing the request to a second plex component.

25. The computer-readable medium of claim 22, wherein the request is a request to change the size of a logical volume.

* * * * *